(12) United States Patent
Chan et al.

(10) Patent No.: US 10,399,573 B1
(45) Date of Patent: Sep. 3, 2019

(54) SYSTEMS AND METHODS FOR ASSESSING VEHICLE OPERATION IN A DIRECTION OF SUNLIGHT

(71) Applicant: BLUEOWL, LLC, San Francisco, CA (US)

(72) Inventors: Aaron Scott Chan, Bloomington, IL (US); Kenneth J. Sanchez, San Francisco, CA (US); Harshit Agarwal, Urbana, IL (US); Yue Liu, Urbana, IL (US); Pravita Tolanavar, Champaign, IL (US); Yuhao Zhou, New York, NY (US); Yuetong Xing, Champaign, IL (US); Keely Renwick, Marshal, IL (US); Abhinav Rai, New Brunswick, NJ (US); Shashwat Gupta, Champaign, IL (US); Utku Pamuksuz, Champaign, IL (US); Taylor Michael Thiel, Urbana, IL (US); Sanjiv Kumar, Boston, MA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 15/874,152

(22) Filed: Jan. 18, 2018

Related U.S. Application Data (60) Provisional application No. 62/447,871, filed on Jan. 18, 2017.

(51) Int. Cl.
*G08B 23/00* (2006.01)
*B60W 40/02* (2006.01)
*B60W 50/00* (2006.01)
*B60W 30/095* (2012.01)
*G06K 9/00* (2006.01)

(52) U.S. Cl.
CPC ........ *B60W 40/02* (2013.01); *B60W 30/0956* (2013.01); *B60W 50/0098* (2013.01); *G06K 9/00845* (2013.01); *B60W 2520/06* (2013.01); *B60W 2540/20* (2013.01); *B60W 2550/12* (2013.01)

(58) Field of Classification Search
CPC ............ B60W 40/02; B60W 30/0956; B60W 50/0098; B60W 2520/06; B60W 2550/12; B60W 2540/20; G06K 9/00845
USPC ....................................... 340/576
See application file for complete search history.

(56) References Cited

U.S. PATENT DOCUMENTS

| 9,702,183 | B1 * | 7/2017 | Ochiai | ...... | E06B 9/24 |
| 2009/0083522 | A1 * | 3/2009 | Boggs | .......... | G05B 19/056 |
| | | | | | 712/220 |
| 2017/0195605 | A1 * | 7/2017 | Alves | .......... | G06K 9/4661 |
| 2018/0089899 | A1 * | 3/2018 | Piemonte | .......... | G01C 21/365 |

* cited by examiner

*Primary Examiner* — Tanmay K Shah
(74) *Attorney, Agent, or Firm* — Marshall, Gerstein & Borun LLP; Randall G. Rueth (57) ABSTRACT

Systems and methods for assessing vehicle operation are provided. According to certain aspects, an electronic device may receive and analyze image data depicting an individual located within a vehicle. The electronic device may also access and compile certain data related to an environment of the vehicle, and specifically to the vehicle's position relative to the sun. According to embodiments, the electronic device may determine, based on the accessed data, whether the vehicle is traveling into a direction of the sun, and may generate and record an indication of the same.

16 Claims, 5 Drawing Sheets

SYSTEMS AND METHODS FOR ASSESSING VEHICLE OPERATION IN A DIRECTION OF SUNLIGHT

CROSS-REFERENCE TO RELATED APPLICATIONS

This application claims benefit of the filing date of U.S. Provisional Patent Application No. 62/447,871, filed Jan. 18, 2017 and titled "SYSTEMS AND METHODS FOR ASSESSING VEHICLE OPERATION IN A DIRECTION OF SUNLIGHT," the disclosure of which is hereby incorporated by reference in its entirety.

FIELD

The present disclosure is directed to detecting and recording parameters associated with vehicle operation. More particularly, the present disclosure is directed to systems and methods for using various data and information to determine whether vehicles are traveling into sunlight.

BACKGROUND

Individuals have been operating and traveling in vehicles as a means of transportation for decades. Of course, certain vehicle operation situations may be considered safer or more dangerous than other vehicle operation situations. For example, driving at night in fog is generally regarded as more dangerous than driving during the day with clear visibility. Further, for example, driving into direct sunlight, such as shortly after the sun rises or shortly before the sun sets, may be considered more dangerous than other driving situations due to the direct sunlight that may affect the vision of the vehicle operator.

Vehicles have experienced an increased prevalence of electronic devices and sensors capable of sensing and generating data associated with vehicle operation. However, even with this increasing prevalence, there are no existing solutions for determining when specific drivers are operating vehicles in certain situations. For example, there is no existing solution for determining when a vehicle operator may be traveling into direct sunlight. Accordingly, there is an opportunity for systems and methods to leverage various data to identify vehicle operators and determine that those vehicle operators are traveling into direct sunlight.

SUMMARY

A computer-implemented method in an electronic device of assessing vehicle operation data may be provided. The method may include receiving image data from at least one image sensor located within the vehicle; analyzing, by a computer processor, the image data to identify an operator of the vehicle; identifying a current time corresponding to approximately when the image data is received; detecting a position metric associated with the vehicle; determining, based on the position metric and the current time, that the vehicle is traveling into a direction of the sun; and recording an indication that the vehicle is traveling into the direction of the sun.

In another embodiment, a system in an electronic device for assessing vehicle operation data may be provided. The system may include a memory configured to store non-transitory computer executable instructions, and a processor configured to interface with the memory. The processor may be configured to execute the non-transitory computer executable instructions to cause the processor to receive image data from at least one image sensor located within the vehicle, analyze the image data to identify an operator of the vehicle, identify a current time corresponding to approximately when the image data is received, detect a position metric associated with the vehicle, determine, based on the position metric and the current time, that the vehicle is traveling into a direction of the sun, and record an indication that the vehicle is traveling into the direction of the sun.

DETAILED DESCRIPTION

The present embodiments may relate to, inter alia, detecting, recording, and compiling various vehicle operation data. Existing vehicle operation environments support the generation of various vehicle operation data. However, there is no way to properly compile the vehicle operation data with certain associations or pairings in a meaningful manner to enable the data to be effectively analyzed and used for subsequent applications or inspections. The present embodiments improve these shortcomings by effectively and efficiently organizing the vehicle operation data for subsequent retrieval and/or analysis.

According to certain aspects, a vehicle or an electronic device within the vehicle may be equipped with one or more image sensors. The image sensor(s) may be configured to capture image data of an operator (or a passenger(s)) of the vehicle and transmit the captured image data to an electronic device. After receiving the image data, the electronic device may access stored user profile data that may include physical characteristics of a set of users. The electronic device may analyze the received image data by comparing the received image data to the stored user profile data to identify an individual depicted in the received image data, where the individual may be an operator of the vehicle.

Further, the electronic device may determine or identify certain vehicle operation and/or environmental parameters or conditions, including but not limited to time and/or date, location data, route information, direction of travel, time of sunrise, time of sunset, weather information, and/or topography information. The electronic device may analyze the data to determine whether the vehicle is traveling in the direction of sunlight, particularly if the time of day is close to sunrise or sunset. The electronic device may also associate the identified individual with an indication of whether the vehicle is traveling in the direction of sunlight. Additionally, the electronic device may further store the data by, for example, generating a vehicle operation log that may indicate the individual and any determined vehicle operation information.

The systems and methods therefore offer numerous benefits. In particular, the individual may review the vehicle operation log to review or recall certain information, or to analyze certain information in an attempt to make various improvements (e.g., determine a different route to take to avoid sunlight). Further, an individual, entity, or the like may access the vehicle operation log for various purposes or applications. For example, an insurance provider may access the vehicle operation log and, based on the data include in the vehicle operation log, may determine a risk profile for the vehicle operator according to the amount of driving into the sunlight. For further example, a parent may access the vehicle operation log to monitor vehicle travel by one or more children. It should be appreciated that other benefits are envisioned.

The systems and methods discussed herein address a challenge that is particular to vehicle operation. In particular, the challenge relates to a difficulty in interpreting the multiple types of data associated with operating vehicles. This is particularly apparent with the increasing amount of vehicle sensors and types of data generated therefrom. In conventional environments, the data is generated and reviewed without any sort of data correlation or log generation. In contrast, the systems and methods automatically correlate certain types of data as the data is recorded or generated, which results in effectively compiled data that may be used for various applications and interpretations. Therefore, because the systems and methods employ the collection, compiling, and storing of data associated with vehicle, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored user profile data to identify individual(s) depicted in the image data, access additional data related to an environment of the vehicle, and analyze the additional data to determine whether the vehicle is traveling in a direction of the sun. This combination of elements further impose meaningful limits in that the operations are applied to improve vehicle data compiling by associating multiple types of distinct data in a meaningful and effective way.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data by comparing the captured image data to stored profile data. The electronic device may also receive or detect certain vehicle operation parameters in real-time or near-real-time, and may automatically and dynamically associate and/or compile the image data and the vehicle operation parameters. In this regard, the individual indicated in the data or accessing the data is afforded the benefit of an accurate and meaningful compilation of data. Further, any individual may access and analyze the data in real-time or near-real-time to efficiently and effectively facilitate any functionalities or processing.

Figure 1A:
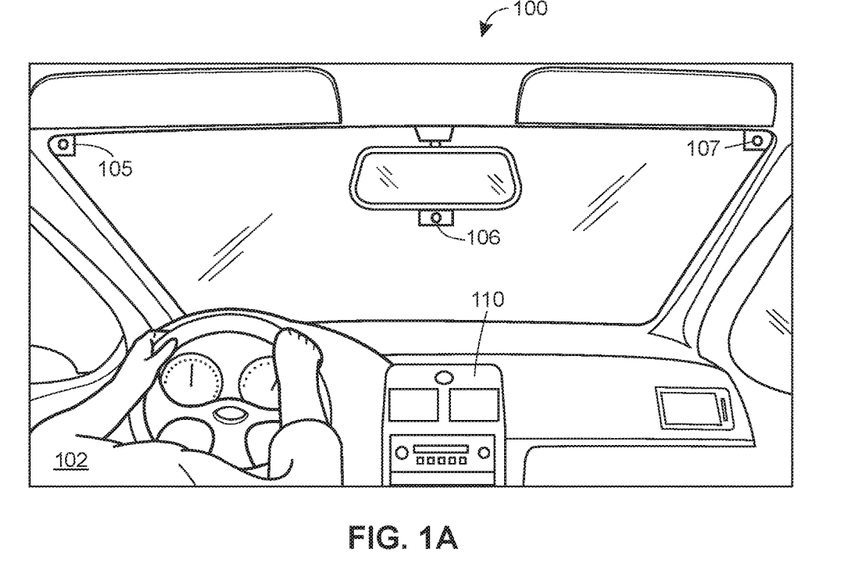
FIGS. 1A and 1B depict exemplary environments within a vehicle including various components configured to facilitate various functionalities, in accordance with some embodiments.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, and/or other sensors.

Figure 1B:
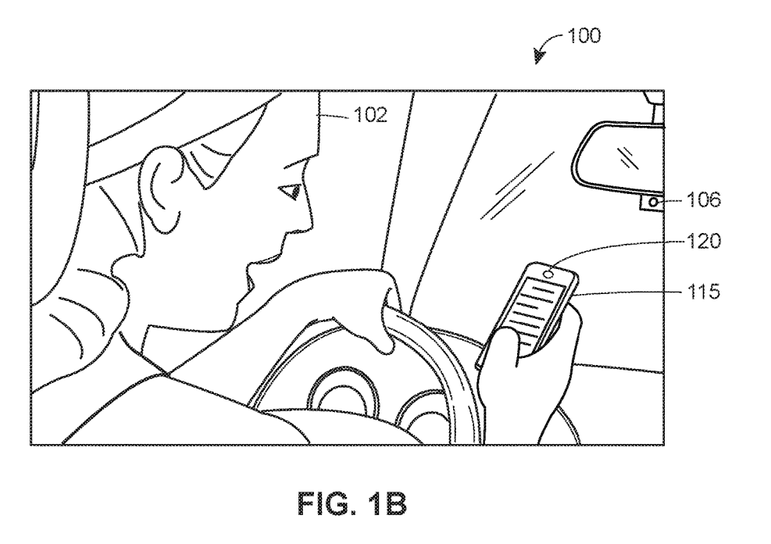

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. The electronic devices 110, 115 may further interface with the various sensors or other components to assess real-time environmental parameters associated with operation of the vehicle 100 (e.g., speed, location, route information, current time, current date, bearing or orientation).

The electronic devices 110, 115 may additionally communicate with remote components via one or more network connections to retrieve additional information related to the environment of the vehicle 100. In particular, the electronic devices 110, 115 may retrieve weather information, sunrise times, sunset times, topography information, and/or other information. The electronic devices 110, 115 may generate a vehicle operation log that may indicate the identified individual and may include any of the vehicle operation parameters, where the vehicle operation log may be later accessed and examined for various applications. In a particular embodiment, the electronic devices 110, 115 may record instances of when the individual 102 is driving into the direction of the sun (i.e., when the individual 102 may be affected by direct sunlight), as well as any data related thereto, including how long the individual 102 is driving into the direction of the sun. The electronic devices 110, 115 may also provide, in real-time, near real-time, or at another time, the generated vehicle operation log to a third party entity or device (e.g., an insurance provider).

According to embodiments, an individual may manually access and examine the vehicle operation log, or a computing device may automatically access and examine the vehicle operation log, to facilitate the various applications. For example, an insurance provider may automatically analyze the vehicle operation log to assess how long or often a driver travels into direct sunlight, and may generate a vehicle insurance policy quote accordingly. Accordingly, the insurance provider may generate the vehicle insurance policy quote in real-time or near-real-time to when the electronic device 110, 115 generates the vehicle operation log. Further, the insurance provider may provide the vehicle insurance policy quote to the individual 102, such as when the individual 102 is still operating the vehicle or otherwise in real-time or near-real-time to generation of the vehicle operation log, where the individual 102 may select to purchase the vehicle insurance policy.

Figure 2:
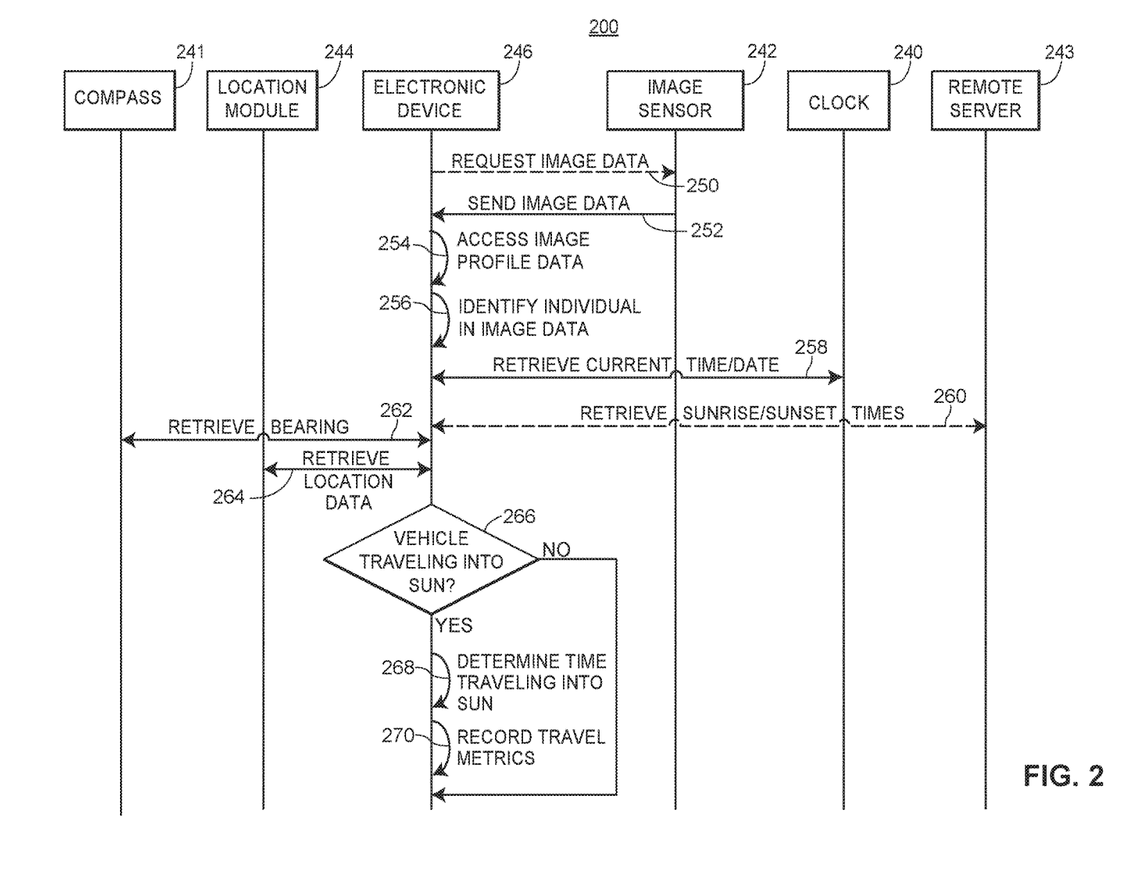
FIG. 2 depicts an exemplary signal diagram associated with analyzing data to determine whether a vehicle is traveling into sunlight, in accordance with some embodiments.

FIG. 2 depicts a signal diagram 200 associated with facilitating certain functionalities associated with the systems and methods. The signal diagram 200 includes a set of components that may be associated with a vehicle: a compass 241 configured to detect an orientation or bearing, a location module 244, an electronic device 246 (such as one of the electronic devices 110, 115 as discussed with respect to FIGS. 1A and 1B), an image sensor 242 (such as one of the image sensors 105, 106, 107, 120 as discussed with respect to FIGS. 1A and 1B), a clock 240 or similar component configured to identify and/or maintain a current time and date, and a remote server 243. According to embodiments, one or more of the compass 241, the location module 244, the image sensor 242, and the clock 240 may be a component of (or separate from) the electronic device 246.

The signal diagram 200 may begin when the electronic device 246 optionally requests (250) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image(s), real-time video, image(s) and/or video recorded five minutes ago). It should be appreciated that the image sensor 242 may be internal to or external from the electronic device 246.

The image sensor 242 may send (252) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. It should be appreciated that the image data may depict a vehicle operator or a passenger of the vehicle.

The electronic device 246 may access (254) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. In one implementation, the electronic device 246 may access the image profile data from the remote server 243. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (256) an individual depicted in the image data based on an analysis of the received image data and the accessed image profile data. According to the embodiments, the individual depicted in the image data may be the vehicle operator or a passenger of the vehicle, where the electronic device 246 may discern whether the individual is the vehicle operator or a passenger based on a positioning of the individual as indicated in the image data. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may retrieve (258) the current time and/or date from the clock 240. It should be appreciated that the clock 240 may be included as part of the electronic device 246. In an implementation, the clock 240 may be a component of the vehicle, such as an on-board system of the vehicle, or as part of an auxiliary device.

The electronic device 246 may also optionally retrieve (260) sunrise and sunset times from the remote server 243 via a network(s). In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. In operation, the electronic device 246 may send a request to the remote server 243 for the projected sunrise and/or sunset time based on the current date and/or time. The remote server 243 may identify the projected sunrise and/or sunset time and send the projected sunrise and/or sunset time back to the electronic device 246. In some implementations, the electronic device 246 may locally store or access the projected sunrise and/or sunset time The electronic device 246 may also retrieve (262) an orientation or bearing from the compass 241. The orientation or bearing may indicate a direction to which the compass 241 is directed (e.g., relative to the four cardinal directions). For example, the orientation or bearing may be 20° (i.e., NNE). Accordingly, if the compass 241 is directed in the same direction as the vehicle, then the orientation or bearing may reflect the direction in which the vehicle is traveling. It should be appreciated that the compass 241 may be included as part of the electronic device 246. In an implementation, the compass 241 may be a component of the vehicle, such as an on-board system of the vehicle, or as part of a standalone device.

Further, the electronic device 246 may retrieve (264) location data from the location module 244. In embodiments, the location data may be in the form of GPS coordinates, or other similar location data. The electronic device 246 may retrieve the location data at multiple points in time, which may indicate movement and/or a direction of travel. It should be appreciated that the location module 244 may be included as part of the electronic device 246. In an implementation, the location module 244 may be a component of the vehicle, such as an on-board system of the vehicle, or as part of an auxiliary device, such as a GPS unit.

According to embodiments, the electronic device 246 may retrieve or access the current time/date, the sunrise/sunset times, the bearing or orientation, and/or the location data concurrently or in various sequences, or in response to various triggers. In an implementation, the electronic device 246 may retrieve the current time/date, the sunrise/sunset times, the bearing or orientation, and/or the location data in response to receiving the image data from the image sensor, in response to identifying the individual depicted in the image data, or in response to another trigger.

The electronic device 246 may determine (266) whether the vehicle is traveling into a direction of the sun (i.e., is driving into sunlight) based on various of the data. In particular, the electronic device 246 may determine whether the vehicle is traveling into a direction of the sun based on any combination of the current time, the current date, the sunrise time, the sunset time, the orientation or bearing, and/or the location data. For example, the electronic device 246 may determine that because (i) the vehicle is traveling west, (ii) the current time is 7:15 PM, and (iii) the sun is projected to set in the west at 7:25 PM, that the vehicle is traveling into the direction of the sun. For further example, the electronic device 246 may determine that because (i) the vehicle is traveling east, (ii) the sun rose in the east at 6:30 AM, and (iii) the current time is 6:35 AM, that the vehicle is traveling into the direction of the sun.

The electronic device 246 may also account for additional data or information when determining whether the vehicle is traveling into a direction of the sun. In one particular embodiment, the electronic device 246 may determine a position of the sun in the sky relative to an orientation of the vehicle (and by extension, the vehicle operator), such as by accounting for an angle of the sun in the sky according to the time of day and the time of year, a direction or bearing of travel by the vehicle, the make/model of the vehicle (which may, for example, indicate a degree that the sunlight may affect the vehicle operator), and/or other information. Additionally, the electronic device 246 may access (e.g., from the remote server 243) topology information of the area in which the vehicle is operating to determine if certain natural or artificial features (e.g., mountains, tall buildings) are blocking the sunlight. Moreover, the electronic device 246 may analyze the image data received in (252) to determine whether the sun is depicted in the image data and to determine whether the vehicle is traveling into a direction of the sun.

In another embodiment, the electronic device 246 may access (e.g., from the remote server 243) weather information and determine, in real-time or near real-time from the weather information, whether the sunlight is visible where the vehicle is operating. For example, the weather information may indicate overcast skies in the vicinity of the vehicle, in which case the electronic device 246 may deem that the sunlight may not be visible and therefore may not affect the vehicle operator as it would if there were no clouds.

Further, the electronic device 246 may calculate a degree or other metric that may correspond to a potential severity of the vehicle traveling into a direction of the sun. For example, if the electronic device 246 determines that a vehicle is traveling directly or near-directly into a direction of the sun that is just about to set (i.e., the sun is just above the horizon), without any topographical features that are blocking the sun, and without any clouds in the vicinity, then the electronic device 246 may calculate and assign a severity of 9.5 (e.g., on a scale of 0-10) to the situation. For further example, if the electronic device 246 determines that a vehicle is traveling at an angle of 20% relative to where the sun sets, that the sun is at an angle of 30% relative to the horizon, and that the sky has intermittent clouds, then the electronic device 246 may calculate and assign a severity of 6 (e.g., on a scale of 0-10) to the situation. Further, for example, if the electronic device 246 determines that the vehicle is traveling directly or near-directly into a direction of the sun that is just about to set and that there are mountains between a line of sight of the vehicle and the sun (i.e., the mountains are blocking the sunlight), then the electronic device 246 may calculate and assign a severity of 1 (e.g., on a scale of 0-10) to the situation.

If the electronic device 246 determines that the vehicle is not traveling into a direction of the sun ("NO") or otherwise that the circumstances related to the sunlight do not pose an elevated risk to the vehicle operator, then processing may end or proceed to any other functionality. If the electronic device 246 determines that the vehicle is traveling into a direction of the sun ("YES") or otherwise that the circumstances related to the sunlight do pose an elevated risk to the vehicle operator, the electronic device 246 may determine (266) or calculate an amount of time that the vehicle spends traveling into a direction of the sun (or otherwise traveling with an elevated risk that results from the sunlight). In an embodiment, the electronic device 246 may continually and in real-time or near real-time monitor the circumstances associated with the sunlight and may record an amount of time that the vehicle spends traveling at the elevated risk. For example, the electronic device 246 may record that a vehicle is traveling into the direction of the sun as the sun rises from 6:20 AM until 6:35 AM, for a total of fifteen (15) minutes.

The electronic device 246 may further record (270) any travel metrics associated with operation of the vehicle. In particular, the electronic device 246 may record the amount of time traveling into a direction of the sun as determined in (266), any weather information, any specifics related to the angle of the sun and/or the direction of travel of the vehicle, any relevant topography information, any calculated or assigned severity, and/or any other data or information that may be relevant to vehicle operation and elevated risk posed to the vehicle operator due to the sunlight. In embodiments, the electronic device 246 may record the information in the form of a vehicle operator log or similar record that the electronic device 246 may update with new information. In particular, the vehicle operation log may include an identification of the vehicle operator, a current time and/or a current date, a location of the vehicle, any information associated with the sunlight and/or the impact thereof, and/or any other information. Accordingly, the vehicle operation log may provide an accurate snapshot of operation of the vehicle by the vehicle operator that may be accessed by one or more users or entities.

Figure 3:
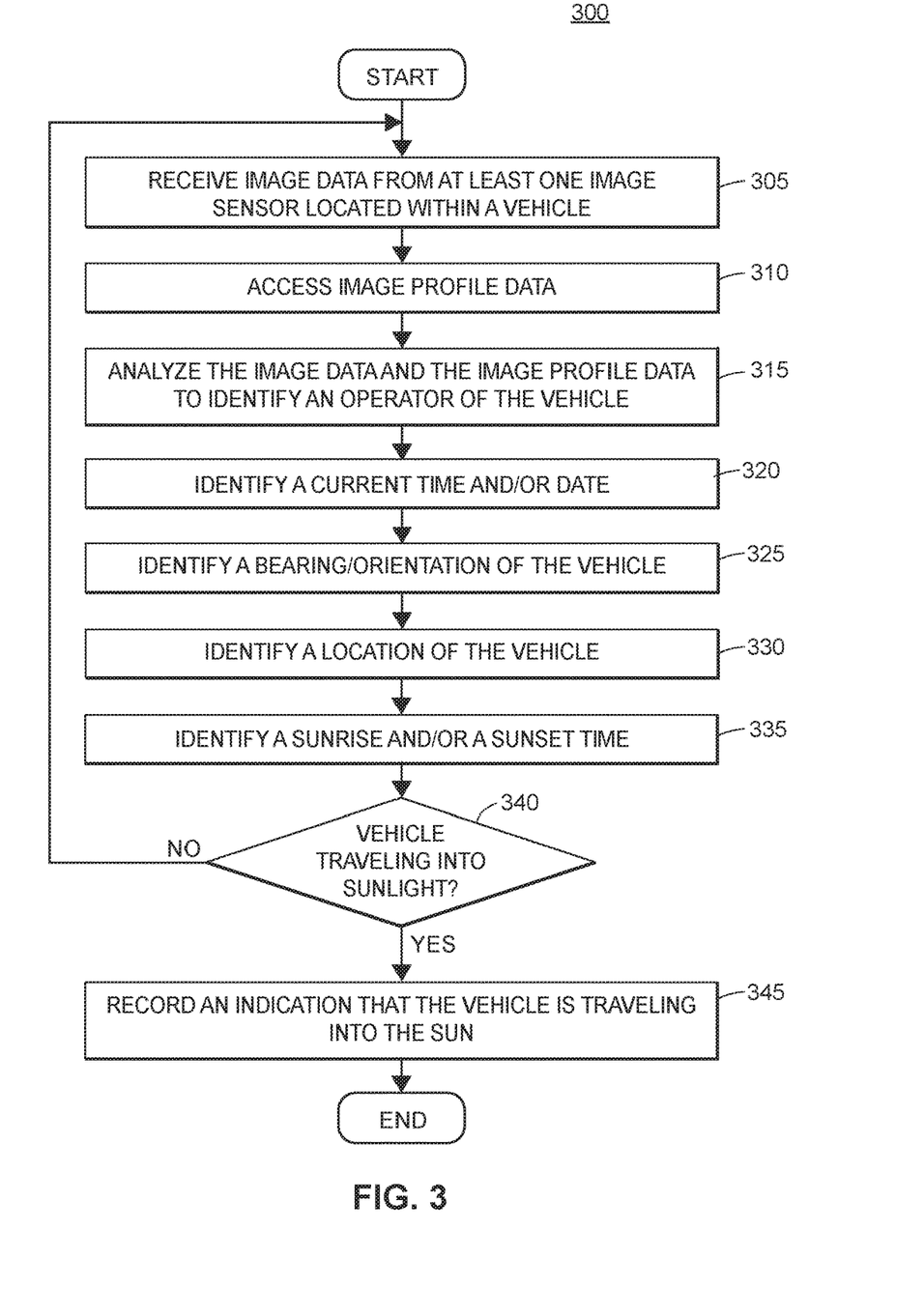
FIG. 3 depicts an exemplary flow diagram associated with analyzing data to determine whether a vehicle is traveling into sunlight, in accordance with some embodiments.

FIG. 3 depicts is a block diagram of an exemplary method 300 of assessing vehicle operation data. The method 300 may be facilitated by an electronic device that may be located within a vehicle or incorporated as part of the vehicle. The electronic device may support execution of a dedicated application that may facilitate the functionalities of the method 300. Further, the electronic device may enable a user or individual (e.g., an operator of the vehicle) to make various selections and facilitate various functionalities.

The method 300 may begin when the electronic device receives (block 305) image data from at least one image sensor located within the vehicle. In embodiments, the image sensor may be a component of the electronic device itself or may be external to the electronic device. Further, the image data may be received in real-time or near real-time as the at least one image sensor captures the image data. After receiving the image data, the electronic device may access (block 310) image profile data associated with a set of individuals. In some embodiments, the set of individuals may be registered to or otherwise associated with the vehicle. Further, the image profile data may indicate physical characteristics (e.g., facial features) of the corresponding set of individuals.

The electronic device may analyze (block 315) the image data and the image profile data to identify an operator of the vehicle who is depicted in the image data. In one implementation, the electronic device may perform a facial recognition analysis using the image data and the image profile data. It should be appreciated that alternate or additional analyses, techniques, calculations, algorithms, or the like are envisioned. In some embodiments, the electronic device may not have enough relevant data to identify the vehicle operator, in which case processing may return to block 305 at which additional image data may be received, or processing may end or proceed to other functionality.

The electronic device may further identify (block 320) a current time and/or a current date. In particular, the electronic device may interface with an integrated or external clock component to access the current time and/or the current date. Further, the electronic device may identify (block 325) a bearing or orientation of the vehicle. In particular, the electronic device may interface with an integrated or external compass component to access the bearing or orientation of the vehicle.

Additionally, the electronic device may identify (block 330) a current location of the vehicle. In particular, the electronic device may interface with an integrated location module (e.g., a GPS chip) or an external location module (e.g., an on-board GPS system of the vehicle) to access the current location. Moreover, the electronic device may identify (block 335) a sunrise time and/or a sunset time that may correspond to the current date. In particular, the electronic device may locally access the sunrise time and/or the sunset time, or may interface with a remote server to retrieve the sunrise time and/or the sunset time. It should be appreciated that the electronic device may identify the current time, the current date, the bearing/orientation, the sunrise/sunset times, and/or the current location in response to receiving the image data of block 305, or at any other point of the method 300. Further, although not depicted in FIG. 3, the electronic device may also access or retrieve other relevant data, including weather data, topography information, and/or other data.

The electronic device may determine (block 340) whether the vehicle is traveling into sunlight (i.e., into a direction of the sun) based on various of the data that the electronic device determines, accesses, and/or identifies. In particular, the electronic device may determine whether the vehicle is traveling into the sunlight based on any combination of the current time and/or date, the bearing or orientation, the location of the vehicle, the sunrise time or the sunset time, any weather or topography information, and/or other data. In an implementation, the electronic device may analyze the image data received in block 305 and determine whether any sunlight is included in the image data, which the electronic device may also use to determine whether the vehicle is traveling into the sunlight.

If the electronic device determines that the vehicle is not traveling into the sunlight ("NO"), processing may return to block 305, end, or proceed to other functionality. If the electronic device determines that the vehicle is traveling into the sunlight ("YES"), the electronic device may record (block 345) an indication that the vehicle is traveling into a direction of the sun. The electronic device may also record other data or information associated with the operation of the vehicle, including an indication of the vehicle operator, a current time, a current date, a current location, route information, weather information, topography information, and/or any other data including any data or information previously identified or determined.

Figure 4A:
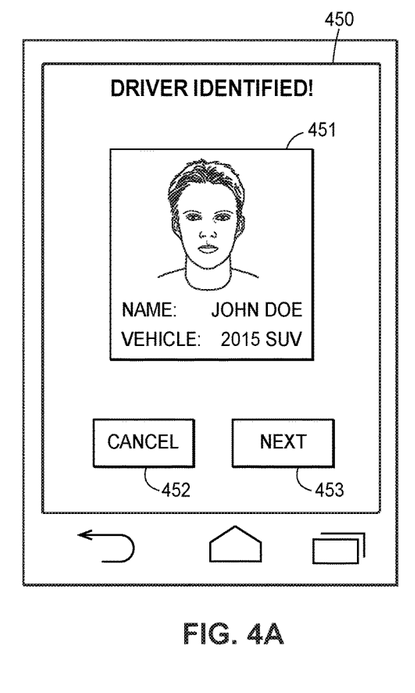
FIGS. 4A and 4B depict exemplary user interfaces associated with generating vehicle operation logs, in accordance with some embodiments.
Figure 4B:
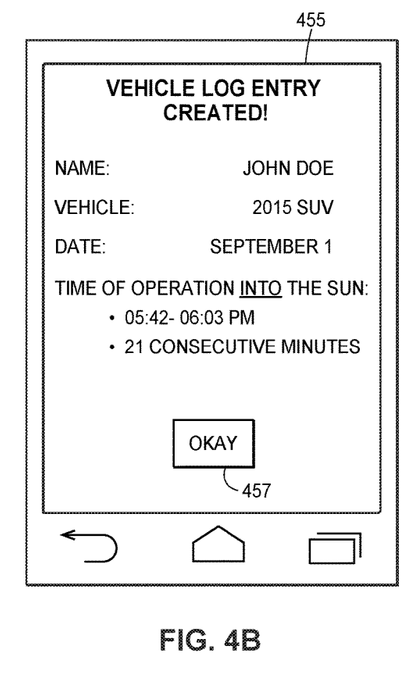

FIGS. 4A and 4B illustrate exemplary interfaces associated with assessing vehicle operation using detected or determined vehicle operation parameters. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 associated with the identification of an individual depicted in image data. The interface 450 may include an information box 451 that identifies the individual (as shown: John Doe) and the vehicle (as shown: 2015 SUV). In embodiments, the electronic device may identify the individual and the vehicle using image data received when the individual is operating the vehicle. The interface 450 may include a "CANCEL" selection 452 that enables an accessing user to select to dismiss the interface 450 and a "NEXT" selection 453 that enables an accessing user to select to proceed to a subsequent interface.

FIG. 4B illustrates an additional interface 455 associated with a vehicle operation log. In some embodiments, the electronic device may display the additional interface 455 in response to the user selecting the "NEXT" selection 453. The interface 455 indicates that a vehicle log entry has been created, where the vehicle log entry may include a set of information 456. As illustrated in FIG. 4B, the set of information 456 may include a vehicle operator name (as shown: John Doe), the vehicle (as shown: 2015 SUV), a date (as shown: September 1), and a time of operation into a direction of the sun (as shown: 05:42-06:03 PM, or 21 consecutive minutes). It should be appreciated that the interface 455 may include alternate or additional information. The interface 455 may also include an "OKAY" selection 457 that enables the user to select to dismiss the interface 455.

Figure 5:
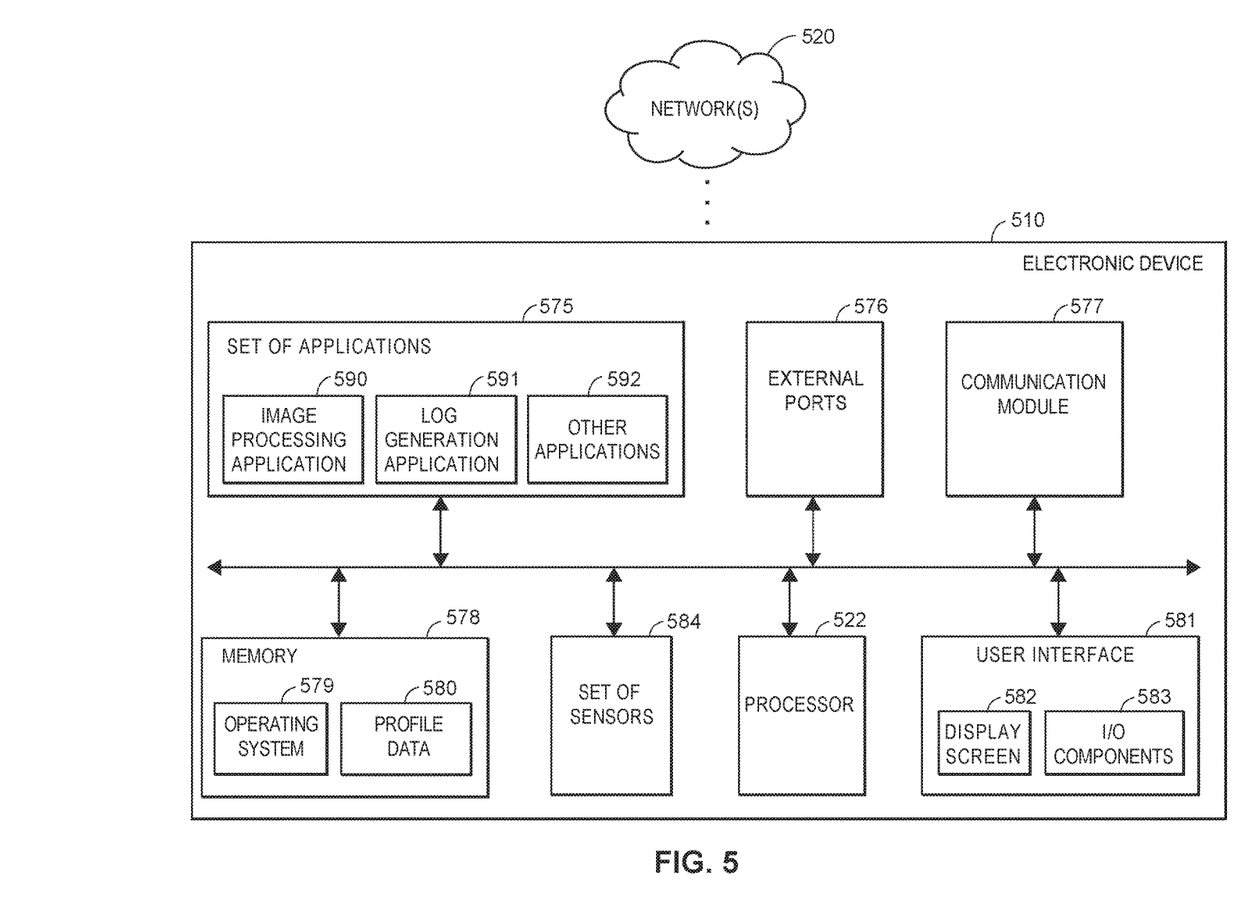
FIG. 5 is a block diagram of an exemplary electronic device, in accordance with some embodiments.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify individuals depicted in the image data, and a log generation application 591 configured to interface with sensors and generate vehicle operation logs that may include various vehicle operation parameters. It should be appreciated that one or more other applications 592 are envisioned, such as an application configured to determine whether a vehicle is traveling into a direction of the sun.

The processor 522 may interface with the memory 578 to execute the operating system 579 and the set of applications 575. According to some embodiments, the memory 578 may also include profile data 580 that may include data associated with a set of individuals associated with a vehicle. In some implementations, the image processing application 590 may interface with the profile data 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote server via the network 520.

The electronic device 510 may further include a set of sensors 584. The processor 522 and the set of applications 575 may interface with the set of sensors 584 to retrieve and process the corresponding sensor data. The set of sensors 584 may include, for example, a location module, an accelerometer, a gyroscope, a compass, a weather sensors, one or more image sensors, and/or the like. In one particular implementation, the log generation application 591 may use various data from the set of sensors 584 to generate vehicle operation logs.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of assessing vehicle operation data, the method comprising:
   receiving image data from at least one image sensor located within the vehicle;
   analyzing, by a computer processor, the image data to identify an operator of the vehicle;
   identifying a current time corresponding to approximately when the image data is received;
   detecting a position metric associated with the vehicle;
   determining, based on the position metric and the current time, that the vehicle is traveling into a direction of the sun;
   identifying a sunset time;
   at the sunset time:
      detecting an updated position metric associated with the vehicle, the updated position metric comprising an updated location and an updated bearing of the vehicle, and
      determining, based on at least the updated location and the updated bearing of the vehicle, that the vehicle is driving into the direction of the sun;
   calculating an amount of time that the vehicle is traveling into the direction of the sun as a difference between the current time and the sunset time; and
   recording the amount of time that the vehicle is traveling into the direction of the sun.

2. The computer-implemented method of claim 1, wherein detecting the position metric associated with the vehicle comprises:
   reading a bearing from a compass.

3. The computer-implemented method of claim 1, wherein detecting the position metric associated with the vehicle comprises:
   reading, from a location module, an initial location of the vehicle; and
   reading, from the location module, a subsequent location of the vehicle;
and wherein determining that the vehicle is traveling into the direction of the sun comprises:
   determining, based on the initial location, the subsequent location, and the current time, that the vehicle is traveling into the direction of the sun.

4. The computer-implemented method of claim 1, wherein detecting the position metric associated with the vehicle comprises:
   reading a bearing from a compass;
   reading, from a location module, a current location of the vehicle;
and wherein determining that the vehicle is traveling into the direction of the sun comprises:
   determining, based on the bearing, the current location, and the current time, that the vehicle is traveling into the direction of the sun.

5. The computer-implemented method of claim 1, wherein determining that the vehicle is traveling into the direction of the sun comprises:
   determining, based on the position metric and the current time, that the vehicle is traveling into the direction of a setting sun or a rising sun.

6. The computer-implemented method of claim 1, wherein determining that the vehicle is traveling into the direction of the sun comprises:
   identifying at least one of a sunrise time and a sunset time; and
   determining, based on the position metric, the current time, and the at least one of the sunrise time and the sunset time, that the vehicle is traveling into the direction of a setting sun or a rising sun.

7. The computer-implemented method of claim 6, wherein identifying the at least one of the sunrise time and the sunset time comprises:
   requesting, from a remote server, the at least one of the sunrise time and the sunset time.

8. The computer-implemented method of claim 1, wherein analyzing the image data comprises:
   analyzing the image data to further identify the sun and a position of the sun;
and wherein determining that the vehicle is driving into the direction of the sun comprises:
   determining, based on the position metric, the current time, and the position of the sun, that the vehicle is driving into the direction of the sun.

9. A system in an electronic device for assessing vehicle operation data, comprising:

a memory configured to store non-transitory computer executable instructions; and a processor configured to interface with the memory, wherein the processor is configured to execute the non-transitory computer executable instructions to cause the processor to:

receive image data from at least one image sensor located within the vehicle,     analyze the image data to identify an operator of the vehicle,     identify a current time corresponding to approximately when the image data is received,     detect a position metric associated with the vehicle,     determine, based on the position metric and the current time, that the vehicle is traveling into a direction of the sun,     identify a sunset time,     at the sunset time:

detect an updated position metric associated with the vehicle, the updated position metric comprising an updated location and an updated bearing of the vehicle, and         determine, based on at least the updated location and the updated bearing of the vehicle, that the vehicle is driving into the direction of the sun,     calculate an amount of time that the vehicle is traveling into the direction of the sun as a difference between the current time and the sunset time, and     record the amount of time that the vehicle is traveling into the direction of the sun.

10. The system of claim 9, further comprising:

a compass;

wherein to detect the position metric associated with the vehicle, the processor is configured to:

read a bearing from the compass.

11. The system of claim 9, further comprising:

a location module;

wherein to detect the position metric associated with the vehicle, the processor is configured to:

read, from the location module, an initial location of the vehicle, and     read, from the location module, a subsequent location of the vehicle;

and wherein to determine that the vehicle is traveling into the direction of the sun, the processor is configured to:

determine, based on the initial location, the subsequent location, and the current time, that the vehicle is traveling into the direction of the sun.

12. The system of claim 9, further comprising:

a compass; and a location module;

wherein to detect the position metric associated with the vehicle, the processor is configured to:

read a bearing from the compass, read, from the location module, a current location of the vehicle;

and wherein to determine that the vehicle is traveling into the direction of the sun, the processor is configured to:

determine, based on the bearing, the current location, and the current time, that the vehicle is traveling into the direction of the sun.

13. The system of claim 9, wherein to determine that the vehicle is traveling into the direction of the sun, the processor is configured to:

determine, based on the position metric and the current time, that the vehicle is traveling into the direction of a setting sun or a rising sun.

14. The system of claim 9, wherein to determine that the vehicle is traveling into the direction of the sun, the processor is configured to:

identify at least one of a sunrise time and a sunset time, and     determine, based on the position metric, the current time, and the at least one of the sunrise time and the sunset time, that the vehicle is traveling into the direction of a setting sun or a rising sun.

15. The system of claim 14, wherein to identify the at least one of the sunrise time and the sunset time, the processor is configured to:

request, from a remote server, the at least one of the sunrise time and the sunset time.

16. The system of claim 9, wherein to analyze the image data, the processor is configured to:

analyze the image data to further identify the sun and a position of the sun;

and wherein to determine that the vehicle is driving into the direction of the sun, the processor is configured to:

determine, based on the position metric, the current time, and the position of the sun, that the vehicle is driving into the direction of the sun.

\* \* \* \* \*